Dec. 2, 1969    G. A. DICKINSON ET AL    3,481,727
CLEANING TOOL FOR FLOAT GLASS CONVEYOR ROLLERS
Filed Dec. 30, 1966    5 Sheets-Sheet 1
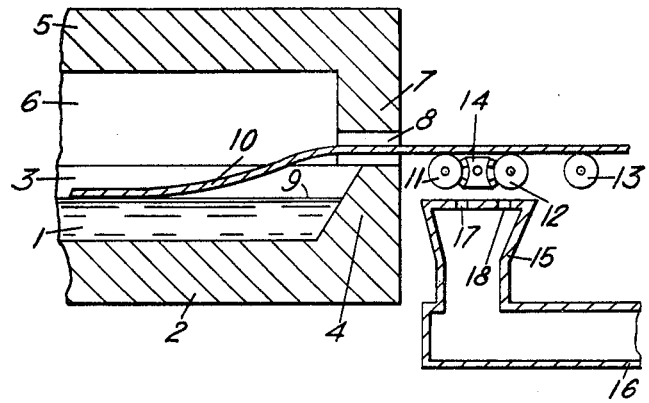
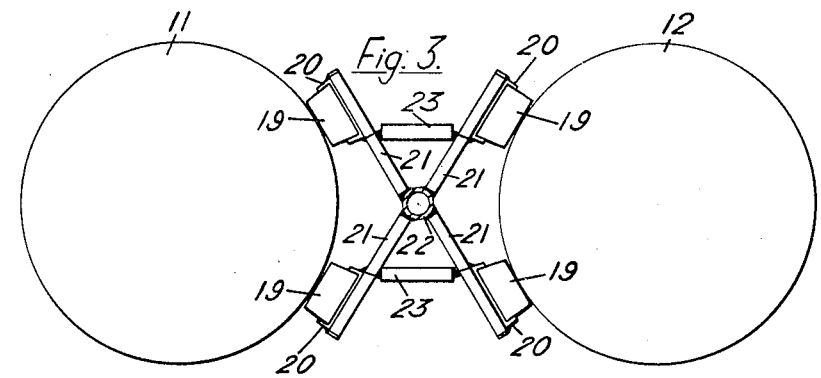
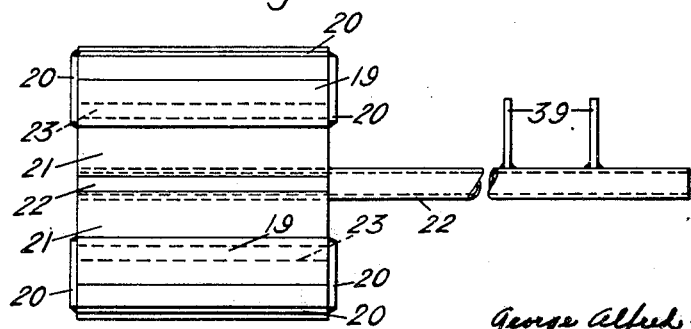
Inventors
George Alfred Dickinson
Brian Stanly Swift
By
Morrison, Kennedy & Campbell
Attorneys

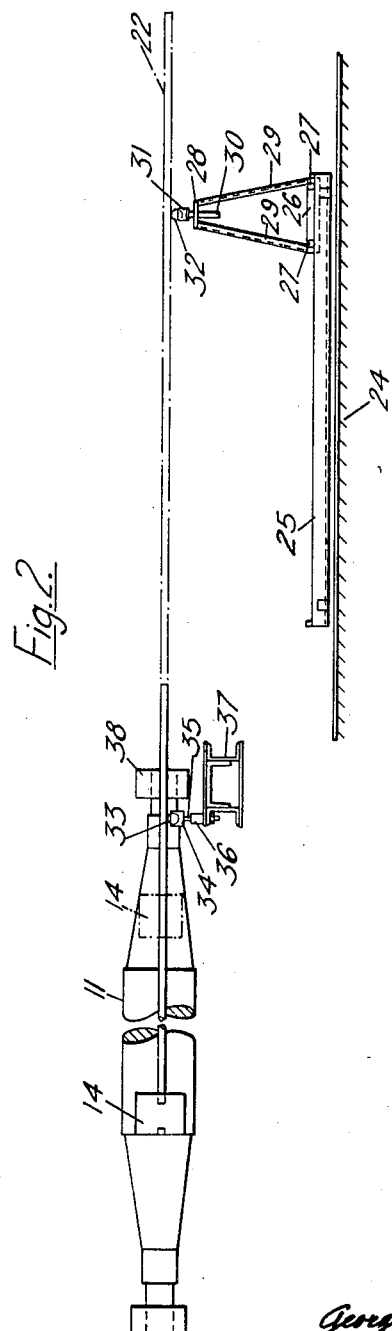

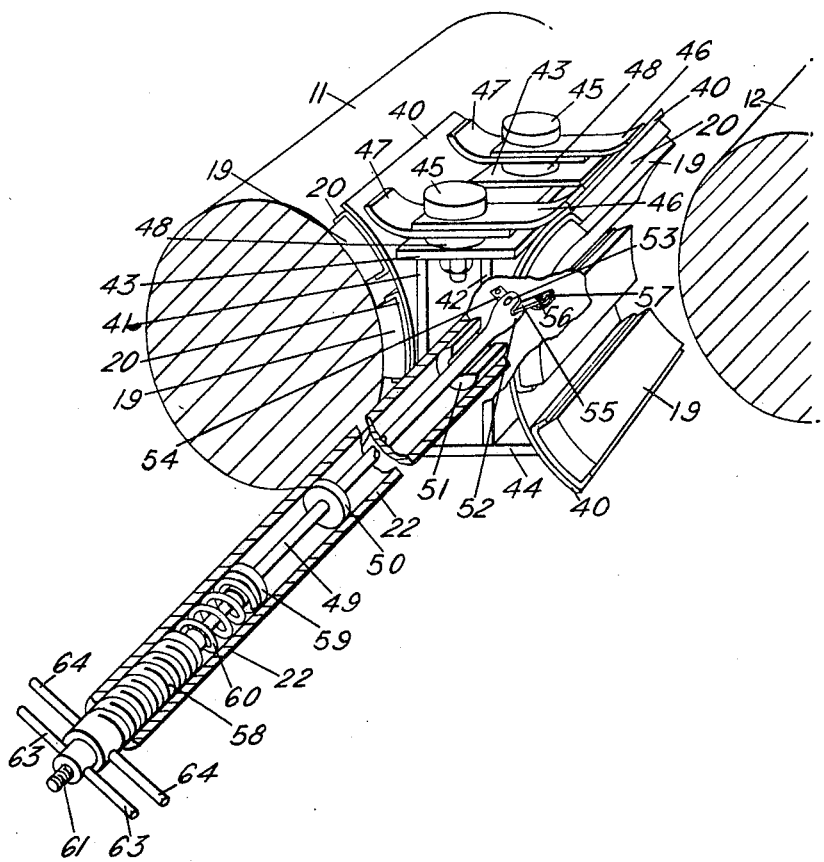

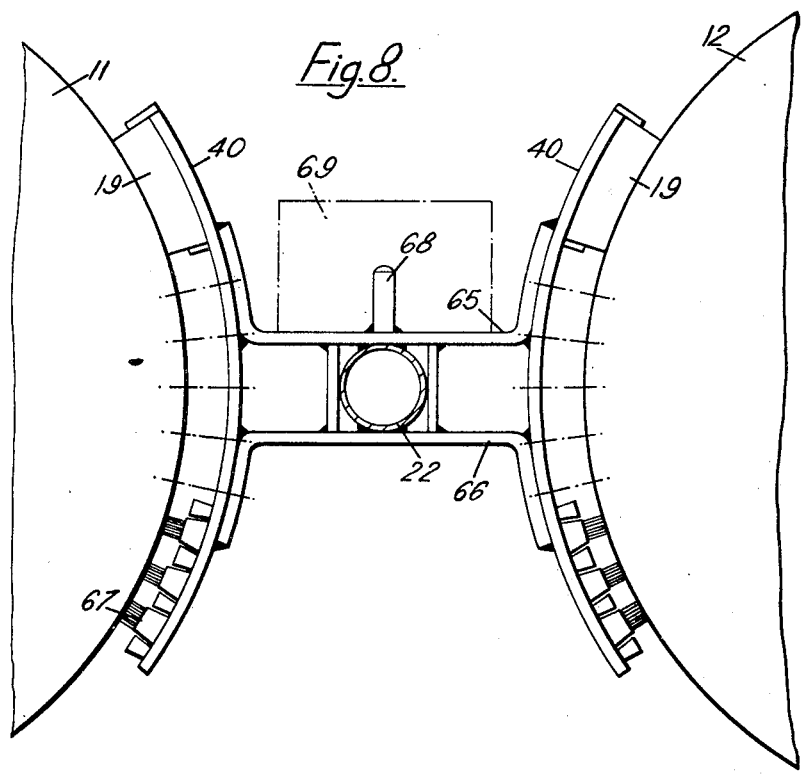

United States Patent Office 3,481,727
Patented Dec. 2, 1969

3,481,727
**CLEANING TOOL FOR FLOAT GLASS
CONVEYOR ROLLERS**
George Alfred Dickinson, St. Helens, and Brian Stanley
Swift, Winstanley, near Wigan, England, assignors to
Pilkington Brothers Limited, Liverpool, England, a
corporation of Great Britain
Filed Dec. 30, 1966, Ser. No. 606,329
Claims priority, application Great Britain, Jan. 24, 1966,
3,112/66
Int. Cl. C03b 18/02
U.S. Cl. 65—168                    10 Claims

ABSTRACT OF THE DISCLOSURE

A cleaning tool for conveyor rollers for transporting float glass from the outlet end of the bath of molten metal, has abrasive surfaces which bear on the surfaces of adjacent horizontal conveyor rollers under the weight of the tool.

---

Figure 6:
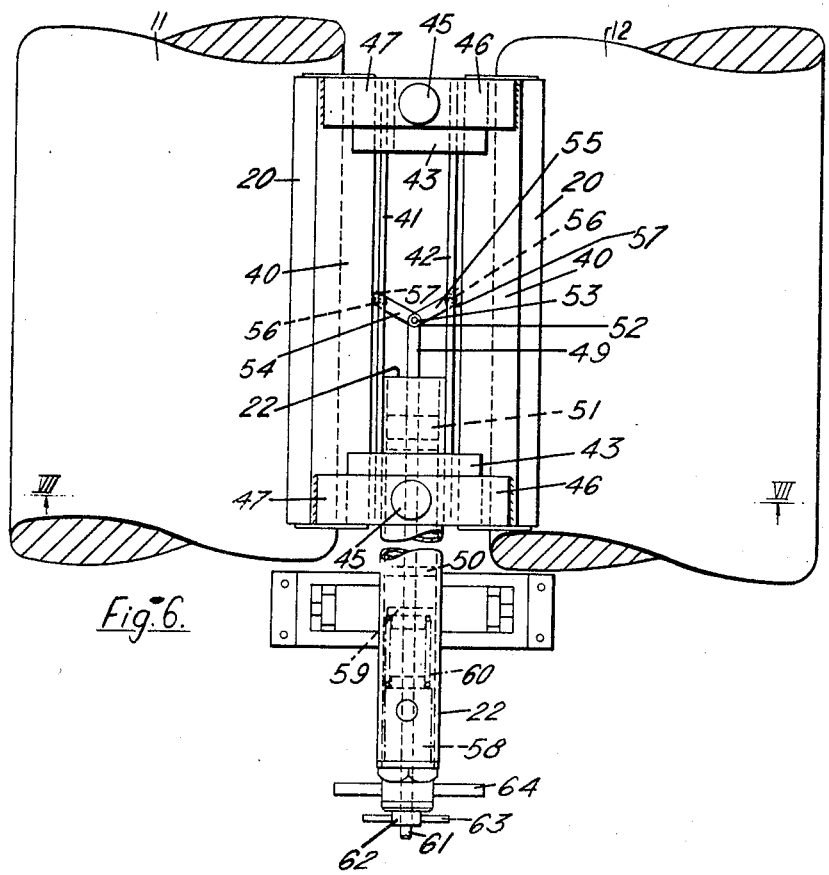

This invention relates to cleaning tools, and more especially to tools for use in cleaning the surfaces of adjacent conveyor rollers for supporting flat glass.

In methods of manufacturing flat glass during which glass is advanced along a bath of molten metal and is discharged from the bath through an outlet at one end of a tank structure containing the bath, the ribbon of flat glass which is discharged through the outlet passes on to conveyor rollers which advance the glass to an annealing lehr in which the glass is cooled gradually.

There is a problem in keeping clean the surfaces of the conveyor rollers located adjacent to the outlet from the tank structure, in particular the conveyor rollers which receive the hot ribbon of glass discharged through the outlet. Impacted material, for example oxides, may collect on the surfaces of these rollers and it is a main object of the present invention to provide a cleaning tool for cleaning the surfaces of these conveyor rollers.

A further object of the invention is to provide an improved method of manufacturing flat glass in which the glass in ribbon form discharged from a bath of molten metal is supported on continuously cleaned conveyor rollers.

According to the invention a cleaning tool for use in cleaning the surfaces of adjacent conveyor rollers for supporting flat glass includes surface cleaning means held in mountings so as to bear against the surfaces of adjacent rollers when the tool is in position between the rollers.

Since the tool bears against two adjacent rollers it is used with advantage between the first and second conveyor rollers immediately following the outlet from the tank structure.

Preferably the surface cleaning means is shaped so as to match the shape of the surfaces of the rollers, and from this aspect of the invention the surface cleaning means comprises abrasive surfaces arranged on two concave arcs so as to engage simultaneously the surfaces of two adjacent conveyor rollers.

In a preferred embodiment of the invention the abrasive surfaces are surfaces of abrasive blocks which are fixed to shoes mounted on a support structure which is so shaped that the tool hangs between the adjacent rollers and the abrasive surfaces are pressed into contact with the roller surfaces by weight of the tool.

Usually the abrasive blocks are much shorter in length than the length of the conveyor rollers to be cleaned and in order to abrade an impacted material from the whole of the surfaces of the rollers the tool is moved to and fro axially of the rollers as they rotate.

To this end the tool includes a support shaft on one end of which the support structure is so mounted that said concave area are coaxial with the shaft, the shaft being longer than the conveyor rollers so that the abrasive surfaces can be moved right along the roller surfaces.

Desirably the support structure is of cruciform cross-section and is centrally connected to the support shaft, and on each leg of the support structure a shoe holding an abrasive block is so mounted that the surfaces of the abrasive blocks lie on said concave arcs.

In another embodiment of the invention the shoes holding the abrasive blocks are fixed to backing plates which are shaped to match the cylindrical form of the rollers, and the backing plates are fixed to the support structure in the region of the top edges of the plates and are centrally connected to adjustable means operable to urge the backing plates and hence the abrasive blocks outwardly, whereby the contact pressure of the abrasive surfaces and roller surfaces is adjustable.

In a preferred arrangement of this embodiment of the invention the support shaft is a tubular shaft and the adjustable means includes an actuating rod extending through the tubular shaft, links pivotally connecting one end of the actuating rod to the backing plates, a nut mounted at the outer end of the support shaft, through which nut the other end of the actuating rod is threaded, and a handle on the outer end of the actuating rod by means of which the rod can be turned in the nut to adjust the pressure of the abrasive blocks against the surfaces of the rollers.

The invention also comprehends a cleaning tool of the kind described above in combination with a conveyor for conveying flat glass, including two bearings for the support shaft of the tool respectively mounted between the ends of two adjacent conveyor rollers and to one side of the conveyor, the bearings being aligned so that the tool can be moved accurately along the roller surfaces by movement of the support shaft relative to the bearings, and means for carrying away abraded material from the region of the rollers.

Further the invention includes a cleaning tool as described above in combination with apparatus for use in the manufacture of flat glass in ribbon form comprising a tank structure holding a bath of molten metal and having an outlet for glass in ribbon form from the bath and conveyor rollers for supporting the ribbon of glass which rollers are mounted beyond the outlet end of the tank structure, said cleaning tool being mounted between two adjacent conveyor rollers so that its surface cleaning means bears on the roller surfaces in order to remove any impacted oxide therefrom, means being provided for carrying away the abraded oxide from the region of the rollers.

Further according to the invention suction means may be provided for collecting and carrying away abraded material from the region of the rollers.

The invention further comprehends the simultaneous abrading of impacted material from the surfaces of adjacent rollers of a series of conveyor rollers and the carrying away of the abraded material, in a method of manufacturing flat glass during which glass is advanced in ribbon form along a bath of molten metal and is supported on a series of conveyor rollers after it has been discharged from the bath.

Figure 7:
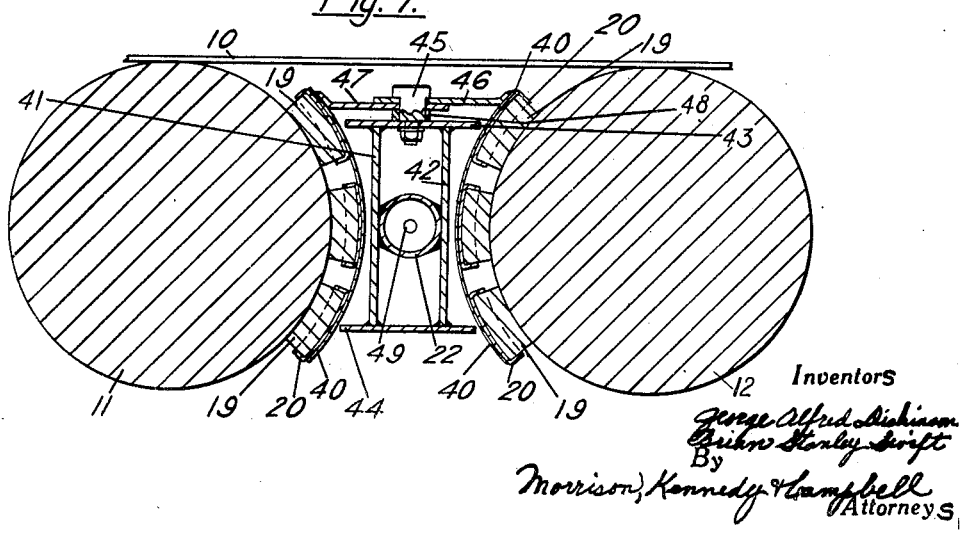

In order that the invention may be more clearly understood some embodiments thereof will now be described, by way of example, with reference to the accompanying drawings in which:

FIGURE 1 is a sectional elevation in diagrammatic form of the outlet end of a tank structure containing a bath of molten metal and showing the position of a cleaning tool according to the invention between the first pair of conveyor rollers on which flat glass in ribbon form is discharged from the bath, FIGURE 2 is a side elevation of the first conveyor roller showing the cleaning tool and its support, FIGURE 3 is an end elevation of a preferred cleaning tool according to the invention, FIGURE 4 is a side elevation of the tool of FIGURE 3, FIGURE 5 is a perspective view partly in section of an adjustable cleaning tool according to the invention shown mounted between two conveyor rollers, FIGURE 6 is a plan view of the cleaning tool of FIGURE 5, FIGURE 7 is a section on line VII—VII of FIGURE 6, and FIGURE 8 is a modified form of cleaning tool according to the invention which embodies brushes for brushing away abraded material from the conveyor rollers.

Referring to the drawings FIGURE 1 shows the outlet end of a tank structure containing a bath 1 of molten metal. The tank structure comprises a floor 2, side walls 3 and an end wall 4 which is integral with the floor 2 and the side walls 3. Over the tank structure there is supported a roof structure comprising a roof 5, side walls 6 and an end wall 7. A slot shaped outlet 8 from the bath of molten metal is defined between the upper surface of the end wall 4 of the tank structure and the lower surface of the end wall 7 of the roof structure. The outlet 8 lies above the surface level 9 of the bath of molten metal 1.

Flat glass in ribbon form 10 is advanced along the bath of molten metal 1. The flat glass may be produced on or treated on the bath of molten metal. As the ribbon of glass 10 is advanced along the bath of molten metal it is cooled until it is sufficiently stiffened to be taken unharmed from the surface 9 of the bath through the outlet 8 by conveyor rollers 11 and 12 mounted outside the tank structure beyond the outlet 8. The upper surface of the conveyor rollers 11 and 12 is just higher than the upper surface of the end wall 4 of the tank structure so that the ribbon of glass 10 is lifted from the bath surface and passes through the outlet 8 without any danger of the underface of the ribbon touching the end wall 4.

The conveyor rollers 11 and 12 are the first two rollers of a series of conveyor rollers. The next roller is indicated at 13, and these conveyor rollers convey the ribbon of glass 10 to an annealing lehr, not shown.

It has been found that foreign material for example oxides may become impacted on the surfaces of the conveyor rollers, in particular on the surfaces of the first two conveyor rollers 11 and 12. The invention provides a cleaning tool for use in cleaning the surfaces of adjacent conveyor rollers and by the use of the tool impacted material is simultaneously abraded from the surfaces of the adjacent rollers 11 and 12. The abraded material is then carried away from the rollers.

A cleaning tool according to the invention, which tool will be described in greater detail below, is indicated at 14 and includes surface cleaning means which bears against both rollers 11 and 12 when the tool is in position between the rollers. Underneath the rollers 11 and 12 there is a suction device 15 which is connected to a main suction duct 16 and has at its upper end two suction slots 17 and 18 respectively located underneath the sides of the tool 14 so that abraded material which falls from the tool 14 is immediately sucked away into the duct 16 through the slots 17 and 18. The duct 16 is connected to a suction fan through a filter device which collects abraded material from the air sucked into the duct 16.

FIGURE 2 is a side elevation of the first conveyor roller 11 showing the tool 14 in its extending position relative to the conveyor roller 11. The tool 14 is much shorter than the conveyor roller 11 and so it has to be moved to and fro between the rollers 11 and 12 as they are rotated to advance the ribbon of glass 10 away from the outlet from the bath. The retracted position of the tool 14 is also shown in dotted lines although the tool is displaced upwardly for the sake of clarity.

The tool 14 is shown in greater detail in FIGURES 3 and 4. The first two conveyor rollers 11 and 12 are indicated in FIGURE 3 and the tool 14 is so shaped that it bears under its own weight against the surface of the rollers 11 and 12 and in effect hangs between the adjacent rollers so that it abrasive surfaces are pressed into contact with the roller surfaces by the weight of the tool.

The tool 14 comprises abrasive surfaces which are the surfaces of abrasive blocks 19 which are fixed in shoes 20 mounted on a support structure of cruciform cross-section. The arms 21 of the support structure are welded to a central support shaft 22 and the tool is strengthened by plates 23 welded between the upper and lower pairs of arms 21.

Each arm 21 of the support structure carries at its outer end one of the shoes 20 holding one of the abrasive blocks 19 and the arrangement of the support structure is such that the surfaces of the abrasive blocks lie on concave arcs so that the abrasive blocks 19 engage simultaneously the surfaces of the two adjacent conveyor rollers 11 and 12. The tool is also so shaped that when it hangs under its own weight between the rollers all four abrasive surfaces are pressed into contact with the roller surfaces by the weight of the tool.

The support shaft 22 is longer than the conveyor rollers 11 and 12 as indicated in FIGURE 2 so that the abrasive surfaces of the abrasive blocks 19 can be moved right along the roller surfaces.

In FIGURE 2 the floor of the shed in which the plant is housed is indicated at 24 and fixed to the floor there are two rails 25 spaced apart. Only one of the rails is shown. A carriage 26 runs on these rails, having wheels 27 which bear on the top surfaces of the rails, and a pedestal 28 is mounted above the carriage 26 on legs 29. An adjustable rod 30 is screwed into a threaded hole in the pedestal 28 and carries on its upper end in a bearing 31 a support roller 32 on which the support shaft 22 of the tool 14 can be pushed.

Between the ends of the conveyor rollers 11 and 12 another support roller 33 for the shaft 22 is mounted in a bearing 34 held at the top end of an adjustable rod 35. The rod 35 is threaded into a block 36 which is fixed to the top of a support beam structure 37 which also carries the drive 38 to one end of the conveyor roller 11.

The support shaft 22 runs on the rollers 32 and 33 when it is pushed in and out parallel to the axis of the rollers 11 and 12 so that the tool 14 is pushed to and fro along the surfaces of the rollers as they rotate.

In order to permit accurate adjustment of the tool 14 relative to the surfaces of the rollers the rollers 32 and 33 which support the shaft 22 can be adjusted vertically in their mountings just described and also the carriage 26 which carries the support roller 32 can be moved along the rails 24 either with the tool 13 as it is moved to and fro or merely to permit adjustment of the outer support point for the support shaft 22 of the tool 14.

The inward and outward movement of the tool 14 may be actuated automatically or alternatively in the embodiment described the outer end of the support shaft 22 may be provided with handles 39 as shown in FIGURE 4 so that the tool 14 can be moved to and fro between the conveyor rollers 11 and 12 manually from time to time as any foreign matter is seen to be collecting on the surfaces of the rollers 11 and 12.

Another embodiment of the invention is illustrated in FIGURES 5, 6 and 7. Referring first to FIGURE 5 which is a perspective view of an adjustable tool according to the invention, the shoes 20 holding the abrasive blocks 19 are fixed to backing plates 40 which are shaped to match the cylindrical form of the rollers. There are three abrasive blocks 19 fixed to each of the backing plates 40, and the two backing plates 40 are fixed so that they are back to back on either side of the support shaft 22. The support shaft 22 is welded between two vertical plates 41 and 42 of a central structure of the tool, the top and bottom of the plates 41 and 42 being closed by two welded cross plates 43 and 44. The cross plates 43 and 44 are present at either end of the tool and in each of the top plates 43 there is fixed a bolt 45 which passes through aligned holes in two support webs 46 and 47 which are respectively welded to the top edges of the backing plates 40. The webs 46 and 47 are held above the upper plates 43 by distance pieces 48 through which the bolts 45 are also threaded.

The connection of the backing plates 40 to the support shaft 22 is the same at both ends of the tool as illustrated in FIGURE 5.

In this embodiment means are provided to adjust the position of the abrasive blocks 19 relative to the roller surfaces so that as the blocks wear they can be urged towards the rollers to take up any play. Also the blocks can be pressed against the roller surfaces so that the contact pressure of the abrasive surfaces on the roller surfaces is adjustable.

In order to provide for this adjustment the support shaft 22 is a tubular shaft and the adjustable means includes an actuating rod 49 extending through the tubular shaft. Guides 50 and 51 are mounted in the tubular support shaft 22 to provide support for the central actuating rod 49. At its inner end located within the tool between the two backing plates 40 the end of the actuating rod 49 is formed as a fork as indicated at 52. A pivot pin 53 is fixed in the fork and connected to the pivot pin 53 are two links 54 and 55 which are respectively pivotally connected by pins 56 to lugs 57 on the backing plates 40.

At its outer end the support shaft 22 has an internal thread and a nut 58 with an external thread is screwed in the outer end of the shaft 22. There is a fixed abutment disc 59 fixed in the shaft near its outer end, and a spring 60 extends between the inner end of the nut 58 and the disc 59. The actuating rod 49 extends through a central bore in the nut 58 and is threaded at its outer end as indicated at 61. A nut 62 is screwed onto the outer end of 61 of the shaft 49. The nut 62 has handles 63 and the nut 58 has handles 64. By means of these handles the position of the actuating rod 49 relative to the nut 58 and the support shaft 22 can be adjusted so that the inclination of the links 54 and 55 is changed and the pressure transmitted through the backing plates 40 to the abrasive blocks 19 is varied so that the pressure of the blocks 19 against the surfaces of the rollers 11 and 12 is adjustable by this means.

In both the embodiments described above with reference to FIGURES 3 and 4 and with reference to FIGURES 5 to 7 suction means such as are illustrated diagrammatically in FIGURE 1 may be employed in combination with the tool in order to suck away impacted material abraded from the surfaces of the rollers 11 and 12.

In a modified form of the invention illustrated in FIGURE 8 the removal of abraded matter from the surfaces of the rollers may be assisted by means of brushes, e.g., of heat resisting steel, fixed to the backing plates. In the tool of FIGURE 8 there are concave backing plates 40 which are fixed by means of support webs 65 and 66 to the central support shaft 22. Abrasive blocks 19 are carried at the upper edges of the backing plates 40 and brushes 67 are fixed to the lower edges of the backing plate 40. The brushes 67 act to sweep from the roller surfaces abraded material freed by the abrasive blocks 19 and this abraded material is caught up in the flow of air into the suction slots 17 and 18. The upper support web 65 has a peg 68 fixed to its top surface and weights indicated at 69 can be threaded over the peg 68 so that the pressure of the abrasive blocks 19 against the roller surfaces is adjustable by adding to or taking away from the weights 69. As the surfaces of the abrasive blocks wear, additional weight can be added so as to keep the surfaces of the blocks 19 in good abrasive contact with the rooler surfaces as the tool is moved to and fro against the roller surfaces.

The invention has been described with reference to the cleaning of the first two conveyor rollers of a series of conveyor rollers mounted just outside the outlet from a tank structure containing a bath of molten metal. The invention may be applied, however, in any location where it is desirable to keep clean any pair of adjacent conveyor rollers and although in the embodiments described adbrasive surfaces are employed for other applications the roller surface cleaning means may be of a lighter nature. For example in place of the abrasive blocks 19 in some applications wire brushes or cloth or carbon or asbestos pads may be sufficient to clean the surfaces of the rollers.

The invention thus provides a new method of apparatus for continually keeping the surfaces of conveyor rollers clean. No hold up in production is necessary in order to clean the rollers and with the adjustable arrangement of FIGURES 5, 6 and 7 the contact pressure of the cleaning surfaces against the roller surfaces may be adjusted to deal with any particularly difficult spot on the conveying roller surfaces and then the pressure relaxed as the tool is moved away from that place.

By the use of the cleaning tool according to the invention it is no longer necessary to take a conveyor roller away from the conveyor in order to clean its surface. This is of considerable advantage in processes for the continuous manufacture of flat glass in ribbon form where it is highly advantageous to keep the roller surfaces clean in particular the surfaces of the conveyor rollers right outside the outlet from the tank structure without in any way interrupting or interfering with the continuous manufacture of the flat glass.

We claim:
1. A cleaning tool for simultaneously cleaning the cylindrical surfaces of a pair of adjacent conveyor rollers in combination with said rollers, said rollers being spaced at a distance from each other on parallel axes in a common horizontally disposed plane and supporting flat glass which is conveyed in a direction perpendicular to the axes of said rollers, said tool comprising a shaft located between and centrally disposed with respect to said rollers and parallel to the axes thereof, support means carried by said shaft for elements presenting abrasive surfaces spaced in the direction of glass travel and simultaneously pressing by the weight of said tool into engagement with substantial surfaces of said adjacent rollers at a position above their parallel axes and below the level of the flat glass supported thereon, said support means including devices for maintaining the spacing of said abrasive surfaces whereby the tool hangs between the adjacent rollers to effect said pressing of said abrasive surfaces into contact with said roller surfaces.

2. A tool according to claim 1, wherein the support means includes backing members on which the abrasive surfaces are mounted, said abrasive surfaces being disposed on two concave arcs matching the surfaces of the adjacent conveyor rollers.

3. A tool according to claim 2, wherein abrasive surfaces are presented by abrasive blocks which are held in shoes mounted on the support means.

4. A tool according to claim 3, wherein the centrally disposed shaft is longer than the conveyor rollers, and means for moving said support means to move the abrasive surfaces axially along the roller surfaces.

5. A tool according to claim 4, wherein the support means is of cruciform cross-section centrally connected to the centrally disposed shaft, one of said shoes being supported on each leg or the cruciform support.

6. A tool according to claim 4, including backing plates to which are fixed the shoes holding the abrasive blocks, which shoes are shaped to match the cylindrical form of the rollers, support webs fixed to the backing plates in the region of the top edges of the backing plates in combination with adjustable means centrally connected to the backing plates and operable to urge the backing plates and the abrasive blocks outwardly, whereby the contact pressure of the abrasive surfaces on the roller surfaces is adjustable.

7. A tool according to claim 6, wherein the support shaft is a tubular shaft and said adjustable means includes an actuating rod extending through the tubular shaft, links pivotally connecting one end of the actuating rod to the backing plates, a nut mounted at the outer end of the support shaft, through which nut the other end of the actuating rod is threaded, and a handle on the outer end of the actuating rod by means of which the rod can be turned in the nut to adjust the pressure of the abrasive blocks against the surfaces of the rollers.

8. A cleaning tool according to claim 4, in combination with a conveyor for conveying flat glass, including two bearings for the support shaft of the tool respectively mounted between the ends of two adjacent conveyor rollers and to one side of the conveyor, the bearings being aligned so that the tool can be moved accurately along the roller surfaces by movement of the support shaft relative to the bearings, and means for carrying away abraded material from the region of the roller.

9. Apparatus according to claim 8, including suction means for collecting and carrying away abraded material from the region of the rollers.

10. Apparatus according to claim 1, including suction means for carrying away abraded oxide from the region of the rollers.

References Cited

UNITED STATES PATENTS

| 1,327,639 | 1/1920 | Stevens | 51—255 X |
| 1,525,901 | 2/1925 | Ackerman | 51—251 |
| 1,728,131 | 9/1929 | Noecker | 198—229 |
| 1,786,820 | 12/1930 | Byrum et al. | 51—255 |
| 3,351,450 | 11/1967 | Silverwood | 65—182 |

S. LEON BASHORE, Primary Examiner

E. R. FREEDMAN, Assistant Examiner

U.S. Cl. X.R.

15—256.52, 256.53; 51—251, 255; 65—65, 99, 27, 182